United States Patent
Beohar et al.

(10) Patent No.: US 10,761,920 B2
(45) Date of Patent: Sep. 1, 2020

(54) INDIVIDUALIZED CHANNEL ERROR DETECTION AND RESOLUTION

(71) Applicant: Bank of America Corporation, Charlotte, NC (US)

(72) Inventors: Vidhu Beohar, Hyperabad (IN); Sandeep Kumar Chauhan, Hyperabad (IN); Pinak Chakraborty, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 175 days.

(21) Appl. No.: 15/407,624

(22) Filed: Jan. 17, 2017

(65) Prior Publication Data

US 2018/0203754 A1 Jul. 19, 2018

(51) Int. Cl.
| | |
|---|---|
| G06F 11/00 | (2006.01) |
| G06F 11/07 | (2006.01) |
| G06F 40/30 | (2020.01) |
| G06N 20/00 | (2019.01) |

(52) U.S. Cl.
CPC ........ G06F 11/079 (2013.01); G06F 11/0709 (2013.01); G06F 11/0772 (2013.01); G06F 40/30 (2020.01); G06N 20/00 (2019.01)

(58) Field of Classification Search
CPC .... G06F 11/008; G06F 11/3664; G06F 15/18; G06F 17/30861; G06F 9/542; G06F 2201/86; G06N 99/005; H04L 45/22
See application file for complete search history.

(56) References Cited

U.S. PATENT DOCUMENTS

| | | | |
|---|---|---|---|
| 5,444,823 A | 8/1995 | Nguyen | |
| 6,505,042 B1 * | 1/2003 | Hafiz | H04W 68/00 455/434 |
| 7,225,226 B2 * | 5/2007 | Fitzpatrick | H04L 51/04 709/205 |
| 8,005,814 B2 | 8/2011 | Coker et al. | |
| 8,452,841 B2 | 5/2013 | Heiss et al. | |
| 9,406,057 B2 * | 8/2016 | Hammad | G06Q 20/202 |
| 9,712,427 B1 * | 7/2017 | Pittman | H04L 67/1097 |
| 9,836,299 B2 * | 12/2017 | Eberlein | G06F 8/65 |
| 9,928,160 B2 * | 3/2018 | Champlin-Scharff | G06F 9/454 |
| 10,216,509 B2 * | 2/2019 | Martin Vicente | G06F 8/65 |
| 10,353,888 B1 * | 7/2019 | Cogan | G06F 16/2453 |
| 10,491,694 B2 * | 11/2019 | Liu | H04N 21/812 |

(Continued)

*Primary Examiner* — Loan L. T. Truong
(74) *Attorney, Agent, or Firm* — Banner & Witcoff, Ltd.; Michael A. Springs

(57) ABSTRACT

Aspects of the disclosure relate to using natural language processing to identify a context of failure associated with a channel error and analyzing the identified context of failure in relation to historic data by machine learning algorithms to identify one or more of a severity ranking, alternate channel, and solution for the channel error. In some instances, a computing platform may receive data corresponding to a system event associated with a channel of server infrastructure, identify a technical issue, customer intent, and customer sentiment of the system event, determine a context of failure of the system event, generate a mapping of the context of failure in relation to historic data, and identify a suggested solution, severity assignment, and alternate channel for the system event based on the mapping of the context of failure in relation to the historic data.

20 Claims, 8 Drawing Sheets

(56) References Cited

U.S. PATENT DOCUMENTS

| | | | |
|---|---|---|---|
| 10,599,449 B1* | 3/2020 | Chatzipanagiotis | G06N 5/022 |
| 2002/0138427 A1* | 9/2002 | Trivedi | G06Q 20/102 705/40 |
| 2002/0194347 A1* | 12/2002 | Koo | G06F 9/542 709/227 |
| 2003/0207691 A1* | 11/2003 | Chen | H04W 24/00 455/450 |
| 2004/0113791 A1* | 6/2004 | Salim | G06K 17/0022 340/572.3 |
| 2007/0192771 A1* | 8/2007 | Annadata | G06F 9/542 719/321 |
| 2009/0077212 A1* | 3/2009 | Appleton | H04L 41/069 709/223 |
| 2012/0078555 A1* | 3/2012 | Banhegyesi | G01D 4/004 702/64 |
| 2012/0278473 A1* | 11/2012 | Griffiths | H04L 67/141 709/224 |
| 2013/0152047 A1* | 6/2013 | Moorthi | G06F 11/368 717/124 |
| 2014/0101706 A1* | 4/2014 | Kardatzke | H04N 21/4334 725/86 |
| 2014/0189115 A1* | 7/2014 | Eggert | H04W 12/06 709/225 |
| 2015/0082277 A1* | 3/2015 | Champlin-Scharff | G06F 9/454 717/120 |
| 2015/0088598 A1* | 3/2015 | Acharyya | G06Q 30/00 705/7.29 |
| 2015/0331779 A1* | 11/2015 | Subramaniam | G06F 11/368 717/124 |
| 2016/0086219 A1* | 3/2016 | Richardson | G06Q 30/0255 705/14.53 |
| 2016/0149987 A1* | 5/2016 | Thompson | H04L 67/02 709/217 |
| 2016/0162376 A1* | 6/2016 | Errickson | G06F 11/1471 714/19 |
| 2016/0173560 A1* | 6/2016 | Datta | G06F 16/9535 709/203 |
| 2016/0189210 A1* | 6/2016 | Lacey | G06N 20/00 705/7.31 |
| 2016/0337350 A1 | 11/2016 | Bud | |
| 2016/0343084 A1 | 11/2016 | Blessman et al. | |
| 2016/0344868 A1 | 11/2016 | Conway et al. | |
| 2016/0345036 A1 | 11/2016 | Farb et al. | |
| 2016/0345082 A1 | 11/2016 | Armstrong et al. | |
| 2016/0350284 A1 | 12/2016 | Yan et al. | |
| 2016/0350856 A1 | 12/2016 | Sandhu et al. | |
| 2016/0352666 A1 | 12/2016 | Katis et al. | |
| 2016/0352900 A1* | 12/2016 | Bell | H04M 3/5175 |
| 2016/0357778 A1 | 12/2016 | MacKenzie et al. | |
| 2016/0358106 A1 | 12/2016 | Anderson et al. | |
| 2016/0358138 A1 | 12/2016 | Shiloh | |
| 2016/0358408 A1 | 12/2016 | Ovalle et al. | |
| 2016/0359635 A1 | 12/2016 | Kreft | |
| 2016/0359636 A1 | 12/2016 | Kreft | |
| 2016/0359741 A1 | 12/2016 | Cooper et al. | |
| 2016/0359776 A1 | 12/2016 | Katis et al. | |
| 2016/0360208 A1 | 12/2016 | Perlman et al. | |
| 2016/0362321 A1 | 12/2016 | Robertson et al. | |
| 2016/0363948 A1 | 12/2016 | Steven et al. | |
| 2016/0364285 A1 | 12/2016 | Swayne et al. | |
| 2016/0364944 A1 | 12/2016 | Elias | |
| 2016/0366036 A1 | 12/2016 | Gupta et al. | |
| 2016/0366183 A1 | 12/2016 | Smith et al. | |
| 2016/0366455 A1 | 12/2016 | Smith | |
| 2016/0366632 A1 | 12/2016 | Cui et al. | |
| 2016/0368508 A1 | 12/2016 | Manci et al. | |
| 2016/0371758 A1 | 12/2016 | Poon et al. | |
| 2016/0373306 A1* | 12/2016 | Saha | H04W 4/80 |
| 2016/0373486 A1 | 12/2016 | Kraemer | |
| 2016/0373891 A1 | 12/2016 | Ramer et al. | |
| 2016/0375361 A1 | 12/2016 | Brenden et al. | |
| 2016/0377309 A1 | 12/2016 | Abiprojo et al. | |
| 2016/0378689 A1 | 12/2016 | O'Hare et al. | |
| 2016/0379005 A1 | 12/2016 | O'Hare et al. | |
| 2016/0379213 A1 | 12/2016 | Isaacson et al. | |
| 2016/0379298 A1 | 12/2016 | Isaacson et al. | |
| 2016/0379312 A1 | 12/2016 | Arjomand et al. | |
| 2016/0380929 A1 | 12/2016 | Katis et al. | |
| 2016/0381025 A1 | 12/2016 | Foerster et al. | |
| 2017/0003939 A1 | 1/2017 | Lovisa et al. | |
| 2017/0004182 A1 | 1/2017 | Simpson et al. | |
| 2017/0004433 A1 | 1/2017 | Raghavan et al. | |
| 2017/0004588 A1 | 1/2017 | Isaacson et al. | |
| 2017/0005819 A1 | 1/2017 | Brandt | |
| 2017/0005967 A1 | 1/2017 | Simpson et al. | |
| 2017/0006032 A1 | 1/2017 | Simpson et al. | |
| 2017/0006135 A1 | 1/2017 | Siebel et al. | |
| 2017/0006521 A1 | 1/2017 | Brandt | |
| 2017/0011029 A1* | 1/2017 | Chatterjee | G06F 17/30705 |
| 2017/0011424 A1 | 1/2017 | Abou-Rizk et al. | |
| 2017/0024640 A1* | 1/2017 | Deng | G06N 3/08 |
| 2017/0111503 A1* | 4/2017 | McGann | H04M 3/5235 |
| 2017/0180459 A1* | 6/2017 | Frank | H04L 67/10 |
| 2018/0260309 A1* | 9/2018 | Simoni | G06F 11/3684 |
| 2018/0267887 A1* | 9/2018 | Dsouza | G06F 11/3684 |
| 2019/0266611 A1* | 8/2019 | de Sousa Moura | G06Q 30/016 |
| 2020/0012548 A1* | 1/2020 | Escutia Garcia | G06F 11/0709 |

\* cited by examiner

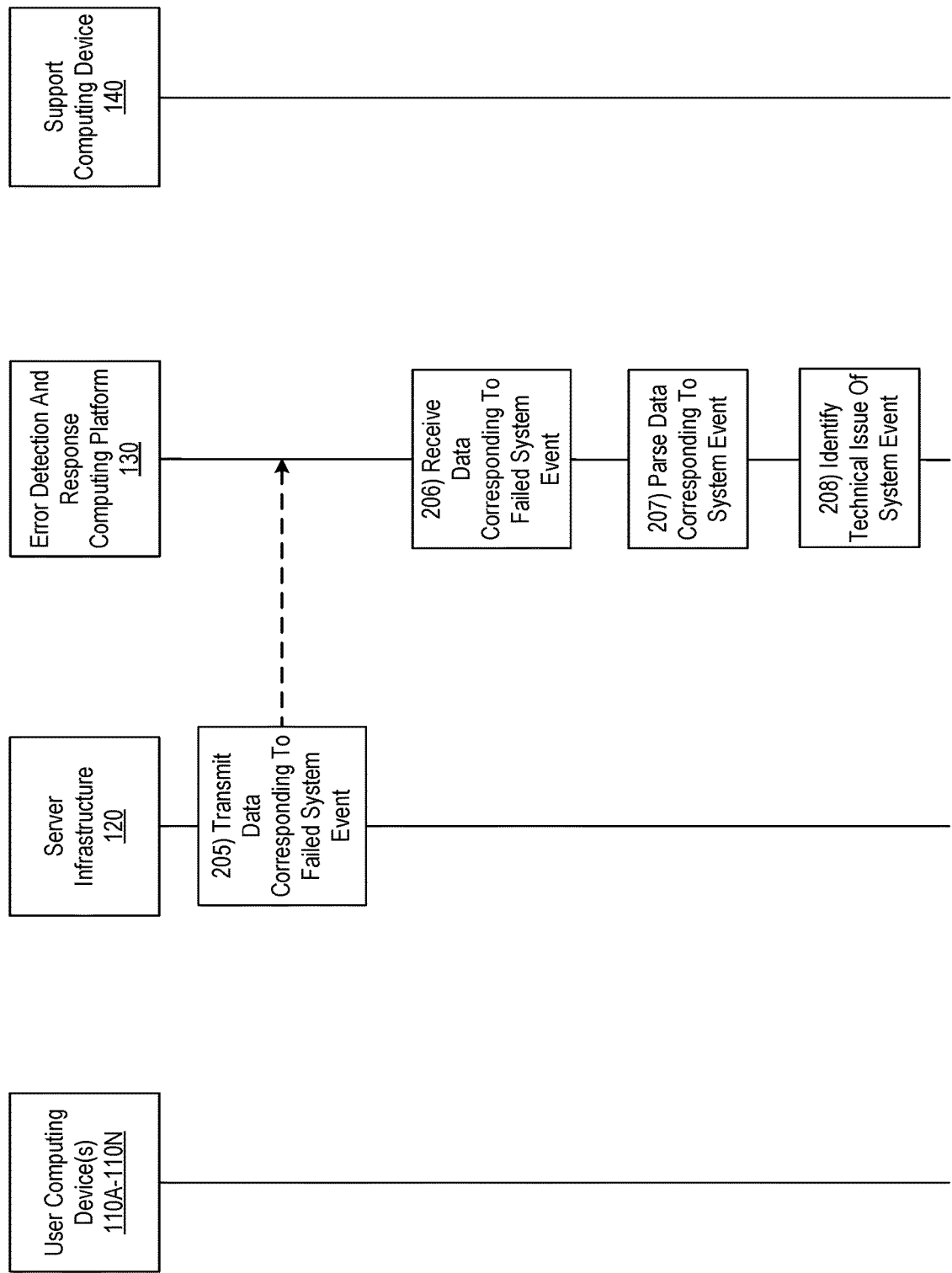

INDIVIDUALIZED CHANNEL ERROR DETECTION AND RESOLUTION

FIELD

Aspects of the disclosure relate to electrical computers, digital processing systems, multicomputer data transferring, and channel error detection and resolution. In particular, one or more aspects of the disclosure relate to using natural language processing to identify a context of failure associated with a channel error and analyzing the identified context of failure in relation to historic data with machine learning algorithms.

BACKGROUND

In web and/or mobile based constructs, users may interact with an organization through different channels. Such channels may involve particular aspects of functionality of the construct including login procurement and verification, form filling and processing, content production and storage, and the like. Despite various measures in place to prevent channel failures during user interactions with an organization, sometimes errors may occur.

When a channel error is detected, a severity ranking may be assigned to the channel error so that an issue with a higher severity ranking can be dealt with more urgently than an issue with a lower severity ranking. The assignment of severity rankings may be based on the technical aspects of the channel error and how many users are impacted by it. For example, a failure of a document submission channel by a single user may be given a lower severity ranking as compared to a failure of an account login channel by a plurality of users.

From a user's view point, however, the context in which the failure occurs may determine the severity ranking. For example, a document submission on the submission due date will be of high severity ranking for the user as its failure might incur irrevocable consequences. Similarly, a person-to-person file transfer made as a gift just before a holiday may be perceived to be of a higher severity ranking than another person-to-person file transfer that does not have such sentiment associated with it. Moreover, failures in certain types of channels may result in a user taking actions that are detrimental to the organization such as reducing interactions and, in some instances, even leaving the organization for a competitor.

SUMMARY

Aspects of the disclosure address these and/or other technological shortcomings by using natural language processing to identify a context of failure associated with a channel error and by analyzing the identified context of failure in relation to historic data with machine learning algorithms.

In particular, one or more aspects of the disclosure provide effective, efficient, scalable, and convenient technical solutions that address and overcome the technical problems associated with channel error detection systems. For example, one or more aspects of the disclosure provide techniques for individualized channel error detection and resolution through the utilization of machine learning and customer intent and sentiment analysis.

In accordance with one or more embodiments, a computing platform having at least one processor, a memory, and a communication interface may receive, via the communication interface, from server infrastructure, data corresponding to a system event associated with a channel of the server infrastructure. Subsequently, the computing platform may identify, based on the data corresponding to the system event, a technical issue, customer intent, and customer sentiment of the system event. Responsive to identifying the technical issue, customer intent, and customer sentiment, the computing platform may determine a context of failure of the system event. Next, the computing platform may generate a mapping of the context of failure in relation to historic data. The computing platform may then identify a suggested solution, severity assignment, and alternate channel for the system event based on the mapping of the context of failure in relation to the historic data. After doing so, the computing platform may transmit a notification including the identified suggested solution, severity assignment, and the alternate channel for the system event via the communication interface to a support computing device. Subsequently, the computing platform may receive, via the communication interface, from the support computing device, data corresponding to an efficacy rating for each of the identified suggested solution, severity assignment, and the alternate channel. After receiving the efficacy rating, the computing device may update the mapping of the context of failure in relation to the historic data based on the efficacy rating of each of the identified suggested solution, severity assignment, and the alternate channel.

In some embodiments, to identify the technical issue, customer intent, and customer sentiment, the computing platform may parse the data corresponding to the system event into categories including page level feedback, complaint text, user memos, and system event information. Then the computing platform may analyze the page level feedback and the system event information to identify the technical issue of the system event. Responsive to identifying the technical issue of the system event, the computing platform may activate a natural language processing application. After activating the natural language processing application, the computing platform may analyze, by the activated natural language processing application, the complaint text and user memos to identify the customer intent and the customer sentiment of the system event.

In some embodiments, the historic data includes root causes of the technical issue, feature availability in all channels, and negative actions including attrition data, reduced activity data, and transfer of services data.

In some embodiments, to generate the mapping of the context of failure in relation to the historic data, the computing platform may activate a machine learning application. Subsequently, the computing platform may generate, using the activated machine learning application, a probabilistic model that associates the context of failure to the historic data. The root causes of the technical issue may be associated with the suggested solution, the feature availability in all channels may be associated with the alternate channel, and the negative actions including the attrition data, reduced activity data, and transfer of services data may be associated with the severity assignment.

In some embodiments, to identify the suggested solution, severity assignment, and alternate channel for the system event based on the context of failure in relation to the historic data, the computing platform may order the probabilistic model from a highest probability to a lowest probability for the context of failure in relation to each of the root causes of the technical issue, feature availability in all channels, and negative actions including attrition data, reduced activity data, and transfer of services data. Then, the computing platform may select the suggested solution, severity assignment, and alternate channel for the system event based the highest probability for the context of failure in relation to each of the root causes of the technical issue, feature availability in all channels, and negative actions including attrition data, reduced activity data, and transfer of services data.

In some embodiments, in updating the mapping of the context of failure in relation to the historic data based on the efficacy rating of each of the identified suggested solution, severity assignment, and the alternate channel, the computing platform may revise the probabilistic model that associates the context of failure to the historic data to account for the efficacy rating of each of the identified suggested solution, severity assignment, and the alternate channel, the mapping of the context of failure in relation to the historic data.

In some embodiments, the alternate channel is updated for a new product launch or inclusion of a product in the channel of the server infrastructure.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 2A, 2B, 2C, 2D, and 2E depict an illustrative event sequence for individualized channel error detection and resolution in accordance with one or more example embodiments.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect and wired or wireless, mounting, connecting, coupling, positioning and engaging.

Figure 1A:
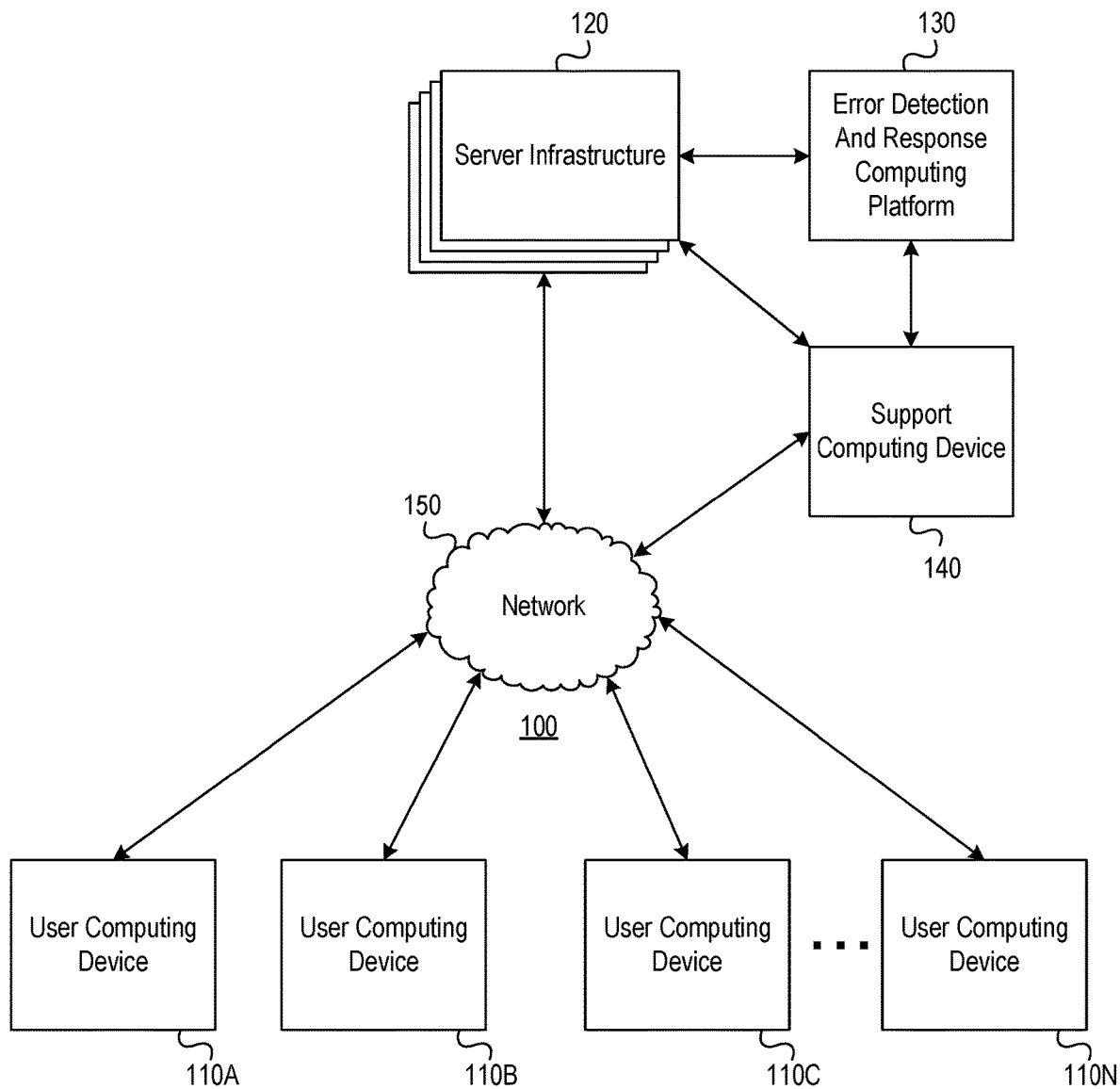
FIGS. 1A and 1B depict an illustrative computing environment for individualized channel error detection and resolution in accordance with one or more example embodiments.
Figure 1B:
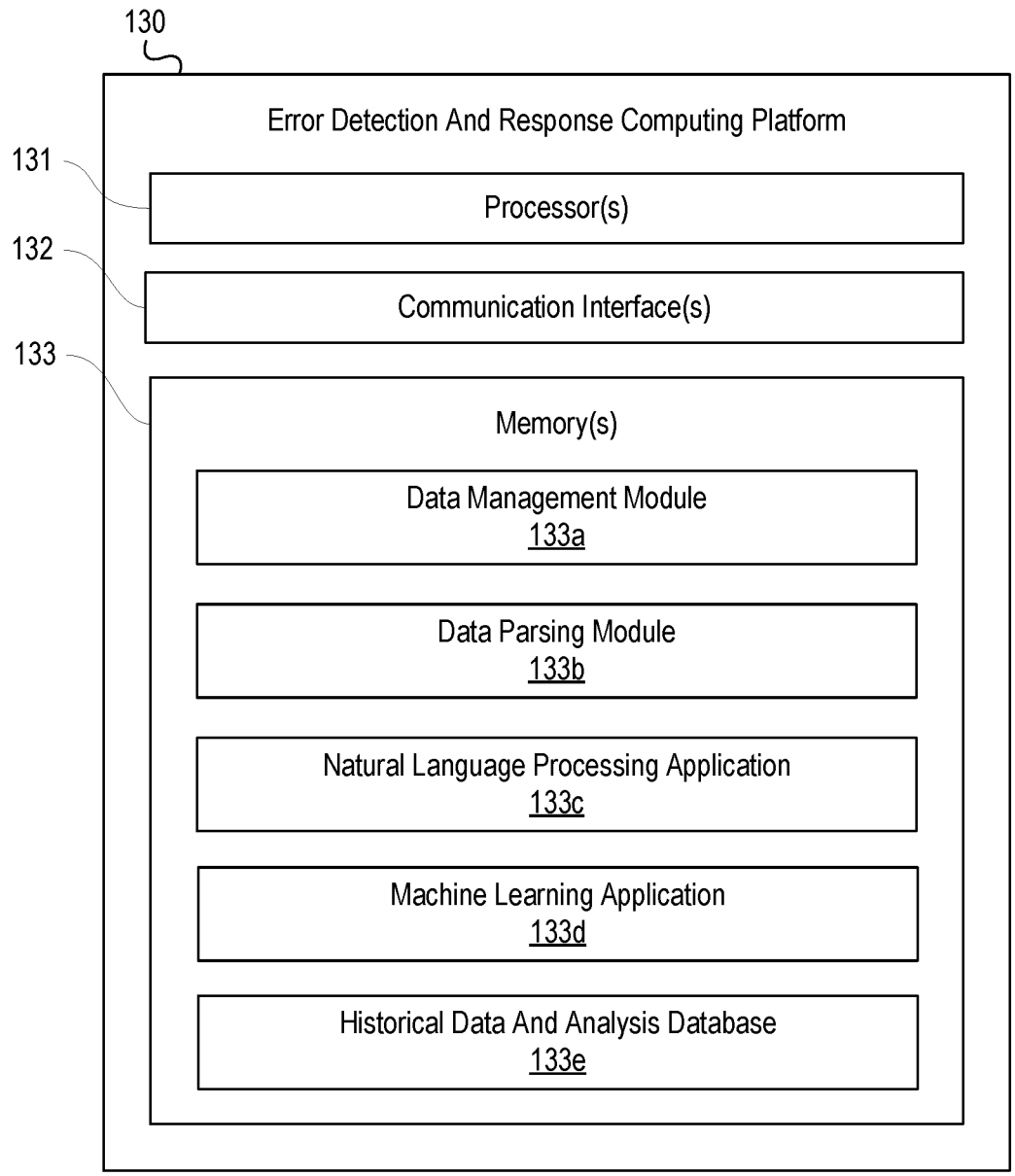

FIGS. 1A and 1B depict an illustrative computing environment for individualized channel error detection and resolution in accordance with one or more example embodiments.

Referring to FIG. 1A, computing environment 100 may include one or more computing devices and/or other computer systems. For example, computing environment 100 may include a number of user computing devices 110A, 110B, 110C . . . 110N, server infrastructure 120, error detection and response computing platform 130, and support computing device 140. Each of the user computing devices 110A-110N, server infrastructure 120, error detection and response computing platform 130, and support computing device 140 may be configured to communicate with each other, as well as with other computing devices, through network 150. In some instances, server infrastructure 120, error detection and response computing platform 130, and support computing device 140 may be configured to communicate with each other through a local and/or internal network. Such a local and/or internal network may be configured to interface with network 150.

Each of the user computing devices 110A-110N may be configured to interact with channels associated with server infrastructure 120 and support computing device 140. Such channels may each involve individual and particular aspects of functionality of server infrastructure 120 and support computing device 140, including login procurement and verification (which may, e.g., be provided via a login procurement and verification channel), form filling and processing (which may, e.g., be provided via a form filling and processing channel), content production and storage (which may, e.g., be provided via a content production and storage channel), error reporting and resolution (which may, e.g., be provided via an error reporting and resolution channel), transaction request and fulfillment (which may, e.g., be provided via a transaction request and fulfillment channel), and the like. As such, each of the user computing devices 110A-110N may be configured to request performance of a system event (e.g., transmit information) corresponding to the particular channel and receive information from server infrastructure 120 and/or support computing device 140 in response to the performance of the system event through the particular channel. In some instances, user computing device 110 may request performance of the system event through a uniform resource locator (URL) associated with the particular channel of the server infrastructure 120 and/or support computing device 140 and/or by way of an application configured to interface with server infrastructure 120 and/or support computing device 140.

Server infrastructure 120 may include a plurality of computer servers and associated server hardware that may host various applications configured to: receive, transmit, and/or store data; control and/or direct actions based on the received, transmitted, and/or stored data; and/or perform other functions as discussed in greater detail below. In some arrangements, server infrastructure 120 may include and/or make up enterprise information technology infrastructure and may host a plurality of enterprise applications, enterprise databases, and/or other enterprise resources. Such applications may, for instance, be executed on one or more servers included in server infrastructure 120 using channels, distributed computing technology, and/or the like to perform system events through channels corresponding to login procurement and verification, form filling and processing, content production and storage, error reporting and resolution, transaction request and fulfillment, and the like. In some instances, server infrastructure 120 may include a relatively large number of servers that may support operations of a particular enterprise or organization, such as a financial institution. As such, server infrastructure 120 may include error detection and response computing platform 130 and/or support computing device 140. In addition, and as discussed in greater detail below, various servers included in server infrastructure 120 may be configured to interface with each of the user computing devices 110A-110N, error detection and response computing platform 130, and/or support computing device 140. Through interfacing, server infrastructure 120 may perform various functions and store data related to individualized channel error detection and resolution.

Error detection and response computing platform 130 may include one or more computing devices configured to receive system event information from server infrastructure 120 corresponding to interactions with user computing devices 110A-110N. As described in further detail below, such system event information may be directly associated with the particular user computing device from 110A-110N to which it corresponds. The system event information may enable error detection and response computing platform 130 to perform various aspects of the individualized channel error detection and resolution including identifying a technical issue, customer intent, and/or customer sentiment of the system event, determining a context of failure, generating a mapping of the context of failure in relation to historic data, identifying a suggested solution, severity assignment, and/or alternate channel for the system event based on the mapping, and the like. As described in further detail below, such processes may be performed in part through the utilization of natural language processing and machine learning applications. Additionally, after completion of the aforementioned processes and under certain conditions, error detection and response computing platform 130 may be configured to interact with support computing device 140. Such interactions may enable resolution of the failed system event to be achieved by way of interaction between support computing device 140 and the particular user computing device from 110A-110N to which the failed system event corresponds. Furthermore, the interactions between support computing device 140 and the particular user computing device from 110A-110N to which the failed system event corresponds may enable error detection and response computing platform 130 to update the natural language processing and machine learning applications.

Support computing device 140 may be configured to communicate with and support the operations of one or more of the user computing devices 110A-110N, server infrastructure 120, and error detection and response computing platform 130. In particular, support computing device 140 may be able to receive information from error detection and response computing platform 130 related to a suggested solution, severity assignment, and/or alternate channel of a failed system event corresponding to a particular user computing device from 110A-110N to which the failed system event corresponds. Additionally, support computing device 140 may be able to transmit the information related to the suggested solution, severity assignment, and/or the alternate channel to the particular user computing device from 110A-110N to which the failed system event corresponds. Furthermore, support computing device 140 may be configured to receive information corresponding to an efficacy rating of the suggested solution, severity assignment, and/or the alternate channel from the particular user computing device from 110A-110N to which the failed system event corresponds.

In one or more arrangements, user computing devices 110A-110N, server infrastructure 120, error detection and response computing platform 130, and/or support computing device 140 may be any type of computing device capable of receiving a user interface, receiving input via the user interface, and communicating the received input to one or more other computing devices. For example, user computing devices 110A-110N, server infrastructure 120, error detection and response computing platform 130, and support computing device 140 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of user computing devices 110A-110N, server infrastructure 120, error detection and response computing platform 130, and support computing device 140 may, in some instances, be special-purpose computing devices configured to perform specific functions.

As stated above, computing environment 100 also may include one or more networks, which may interconnect one or more of computing devices 110A-110N, server infrastructure 120, error detection and response computing platform 130, and support computing device 140. For example, computing environment 100 may include network 150. Network 150 may include one or more sub-networks (e.g., local area networks (LANs), wide area networks (WANs), or the like). As stated above, server infrastructure 120, error detection and response computing platform 130, and support computing device 140 may be connected via a local and/or internal network, which is configured to interface with network 150.

Referring to FIG. 1B, error detection and response computing platform 130 may include processor(s) 131, communication interface(s) 132, and memory 133. A data bus may interconnect processor(s) 131, communication interface(s) 132, and memory 133. Communication interface(s) 132 may be configured to support communications between error detection and response computing platform 130 and one or more of server infrastructure 120 and support computing device 140. In some instances, communication interface(s) 132 may also be configured to support communications between error detection and response computing platform 130 and user computing devices 110A-110N. Memory 133 may include one or more program modules and/or applications having instructions that, when executed by processor(s) 131, cause error detection and response computing platform 130 to perform one or more functions described herein and/or manage one or more databases that may store and/or otherwise maintain information which may be used by such program modules and/or applications during execution by processor(s) 131. In some instances, the one or more program modules, applications, and/or databases may be stored by and/or maintained in different memory units of error detection and response computing platform 130. For example, memory 133 may have, store, and/or include a data management module 133a, data parsing module 133b, natural language processing application 133c, machine learning application 133d, and historical data and analysis database 133e.

Data management module 133a may have instructions that facilitate many of the individualized channel error detection and response processes described herein. For instance, data management module 133a may initially process data corresponding to a system event received from server infrastructure 120 by way of communication interface (s) 132. Subsequently, data management module 133a may be configured to route and/or ferry the system event data to and/or between data parsing module 133b, natural language processing application 133c, machine learning application 133d, and historical data and analysis database 133e. Additionally, data management module 133a may be configured to process the system event data. In particular, data management module 133a may have instructions that cause error detection and response computing platform 130 to analyze the system event data to identify a technical issue, activate natural language processing application 133c and machine learning application 133d, determine a context of failure of the system event data, identify a suggested solution, severity assignment, and alternate channel for the system event, as well as other functions described in detail below. Further, data management module 133a may facilitate transmittal of the system event data after processing has been performed to support computing device 140 by way of communication interface(s) 132.

Data parsing module 133b may have instructions that direct and/or cause error detection and response computing platform 130 to parse received data corresponding to a system event from server infrastructure 120 by way communication interface(s) 132 according to predetermined settings. In particular, data parsing module 133b may be configured to parse the data corresponding to the system event into categories including page level feedback, complaint text, user memos, and system event information. Additionally, intelligent content parsing module 113b may perform other functions, as discussed in greater detail below.

Natural language processing application 133c may have instructions that direct and/or cause error detection and response computing platform 130 to analyze the data corresponding to the system event (e.g., complaint text, user memos, and the like) to identify a customer intent and/or customer sentiment associated with the system event. Additionally, natural language processing application 133c may perform other functions, as discussed in greater detail below.

Machine learning application 133d may have instructions that direct and/or cause error detection and response computing platform 130 to set, define, and/or iteratively redefine rules and/or other parameters stored in historical data and analysis database 133e that are used to generate a mapping of the context of failure of the system event with historic data also stored in historical data and analysis database 133e. Further, machine learning application 133d may be configured to update the rules and/or other parameters based on an efficacy rating provided by a user of one of user computing devices 110A-110N corresponding to the accuracy of the mapping. Additionally, machine learning application 133d may perform other functions, as discussed in greater detail below.

Historical data and analysis database 133e may store information corresponding to each of the data management module 133a, data parsing module 133b, natural language processing application 133c, and/or machine learning application 133e. In particular, historical data and analysis database 133e may store information related to previously processed system events. Such information may include the context of failure determined for the previous system events, the identified suggested solution, severity assignment, and alternate channel for the previous system events, as well as the associated efficacy ratings of the identified suggested solution, severity assignment, and alternate channel.

FIGS. 2A, 2B, 2C, 2D, and 2E depict an illustrative event sequence for individualized channel error detection and resolution. In the illustrative event sequence, processing of data associated with a system event is focalized at error detection and response computing platform 130. However, as mentioned above, in instances in which server infrastructure 120, error detection and response computing platform 130, and/or support computing device 140 are a single computing system, the illustrative event sequence for individualized channel error detection and resolution may be performed at server infrastructure 120.

Figure 2A:
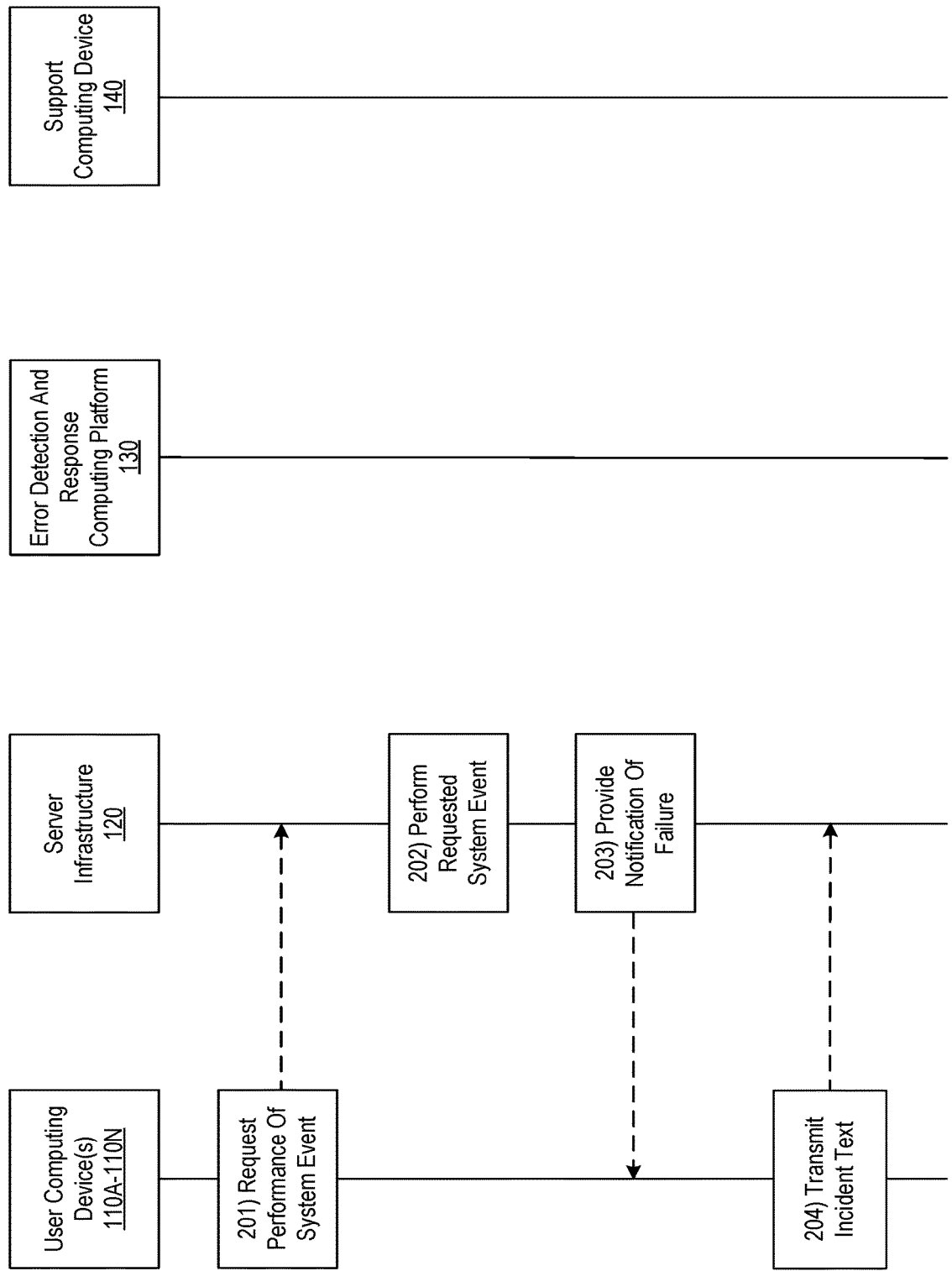

Referring to FIG. 2A, at step 201, users of one or more of user computer devices 110A-110N may request performance of a system event associated with a particular channel at server infrastructure 120. The request by one or more of user computer devices 110A-110N may be sent through an application configured to interface with server infrastructure 120 operating on the respective one or more user computing devices 110A-110N and/or by way of a web browser sending a request to a URL associated with the particular channel of the server infrastructure 120. In either event, as stated above, the system event may be a computing action corresponding to a particular channel of server infrastructure 120. For instance, such channels may relate to login procurement and verification, form filling and processing, content production and storage, error reporting and resolution, transaction request and fulfillment, and the like. As such, a system event may relate to an instance of login procurement and verification, form filling and processing, content production and storage, error reporting and resolution, transaction request and fulfillment, and the like initiated by a particular user of a particular user computing device of the one or more of user computer devices 110A-110N.

At step 202, server infrastructure 120 may perform the requested system event. In some instances, the system event may be executed by server infrastructure 120 without failure. In such instances, the server infrastructure 120 may provide notification to the respective user computing device from 110A-110N associated with the request of step 201 that the system event was performed successfully. Alternatively, sever infrastructure 120 may transmit information to the respective user computing device from 110A-110N to update a user interface in a manner indicative of a successfully performed system event (e.g., allowing access to a user profile, for instance). In other instances, the system event may fail to be executed by server infrastructure 120. Sometimes the failure may be attributed to user error (e.g., incorrect username/password combination). In such cases, a notification and/or information to update a user interface may be transmitted to the respective user computing device from 110A-110N notifying the user that the system event has failed because of user error.

Alternatively, the failure may be associated with a channel error corresponding to the requested system event at server infrastructure 120. In such instances, at step 203, the server infrastructure 120 may provide a notification of failure to the respective user computing device from 110A-110N associated with the request of step 201. Alternatively, sever infrastructure 120 may transmit information to the respective user computing device from 110A-110N to update a user interface in a manner indicative of a failed system event because of a channel error. In either event, the notification and/or information to update the user interface at the respective user computing device from 110A-110N may include an input field through which a user of the respective user computing device from 110A-110N may input incident text describing the manner in which the failure impacts the user.

At step 204, the user of the respective user computing device from 110A-110N may enter the incident text through the input field of the notification and/or user interface and the incident text may be subsequently transmitted to server infrastructure 120 by the respective user computing device from 110A-110N. In some cases, however, a user may not provide incident text corresponding to the failed system event and step 204 may be skipped. As will be described in further detail below, in such cases, the context of failure of the system event may be determined without such information.

Referring to FIG. 2B, at step 205, server infrastructure 120 may transmit data corresponding to the failed system event to error detection and response computing platform 130. Such data may include at least a system event identification number corresponding to the failed system event, a user identification number corresponding to the respective user computing device from 110A-110N associated with the system event, the incident text (if provided by the user), and further information related to the failed system event as will be described in further detail below.

At step 206, error detection and response computing platform 130 may receive the data corresponding to the failed system event by way of communication interface(s) 132. In particular, the data corresponding to the failed system event may be received by way of communication interface(s) 132 and handled by data management module 133a. After receipt, data management module 133a may route the data corresponding to the failed system event to data parsing module 133b.

At step 207, data parsing module 133b may parse the data corresponding to the failed system event into a plurality of data categories. Such data categories may include page level feedback, complaint text, user memos provided by the user during request of the system event, and system event information. After parsing, data parsing module 133b may route the data corresponding to the failed system event to data management module 133a.

At step 208, after data parsing module 133b has parsed the data corresponding to the failed system event into the plurality of categories and data management module 133a has received the parsed data from data parsing module 133b, data management module 133a may identify a technical issue of the system event. In particular, data management module 133a may analyze the page level feedback and system event information to identify the technical issue of the system event.

Figure 2C:
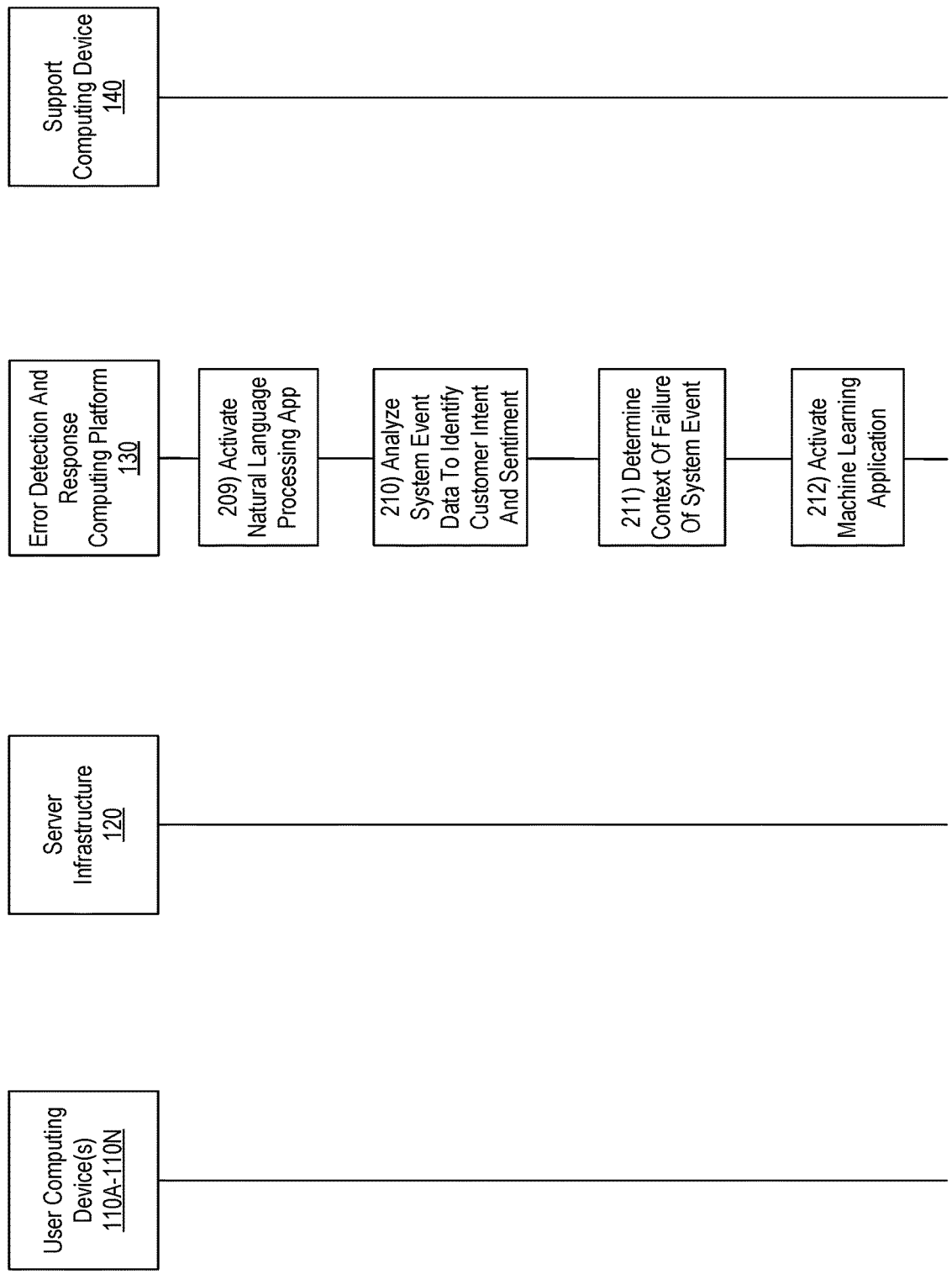

Referring to FIG. 2C, at step 209, responsive to identifying the technical issue of the system event, data management module 133a of error detection and response computing platform 130 may activate natural language processing application 133c and may route the complaint text and user memos to the activated natural language processing application 133c.

At step 210, the natural language processing application 133c of error detection and response computing platform 130 may analyze the user memos to identify a customer intent of the system event and the complaint text to identify a customer sentiment of the system event. The customer intent may correspond to the nature and/or purpose (e.g., birthday gift, holiday present, and the like) of the system event and the customer sentiment may correspond to the customer's feelings (e.g., unsatisfied, angry, disappointed, and the like) after the failure of the attempted system event. In order to identify the customer intent and sentiment from the user memos and complaint text, respectively, the natural language processing application 133c may compare the user memos and complaint text against a plurality of previously analyzed user memos and complaint text stored in historical data and analysis database 133e. In instances in which the user failed to provide the complaint text at step 204, the natural language processing application might only analyze the user memos to identify the customer intent of the system event. After identifying the customer intent and customer sentiment of the system event, natural language processing application 133c may provide such information to data management module 133a.

At step 211, after receiving information corresponding to the customer intent and the customer sentiment, the data management module 133a of error detection and response computing platform 130 may determine a context of failure of the system event. The context of failure may be an association of the technical issue, customer intent, and customer sentiment of the system event.

At step 212, responsive to determining the context of failure of the system event based on the technical issue, customer intent, and customer sentiment, data management module 133a may activate machine learning application 133d of error detection and response computing platform 130. After activating the machine learning application 133d, data management module 133a may route the determined context of failure to the machine learning application 133d.

Figure 2D:
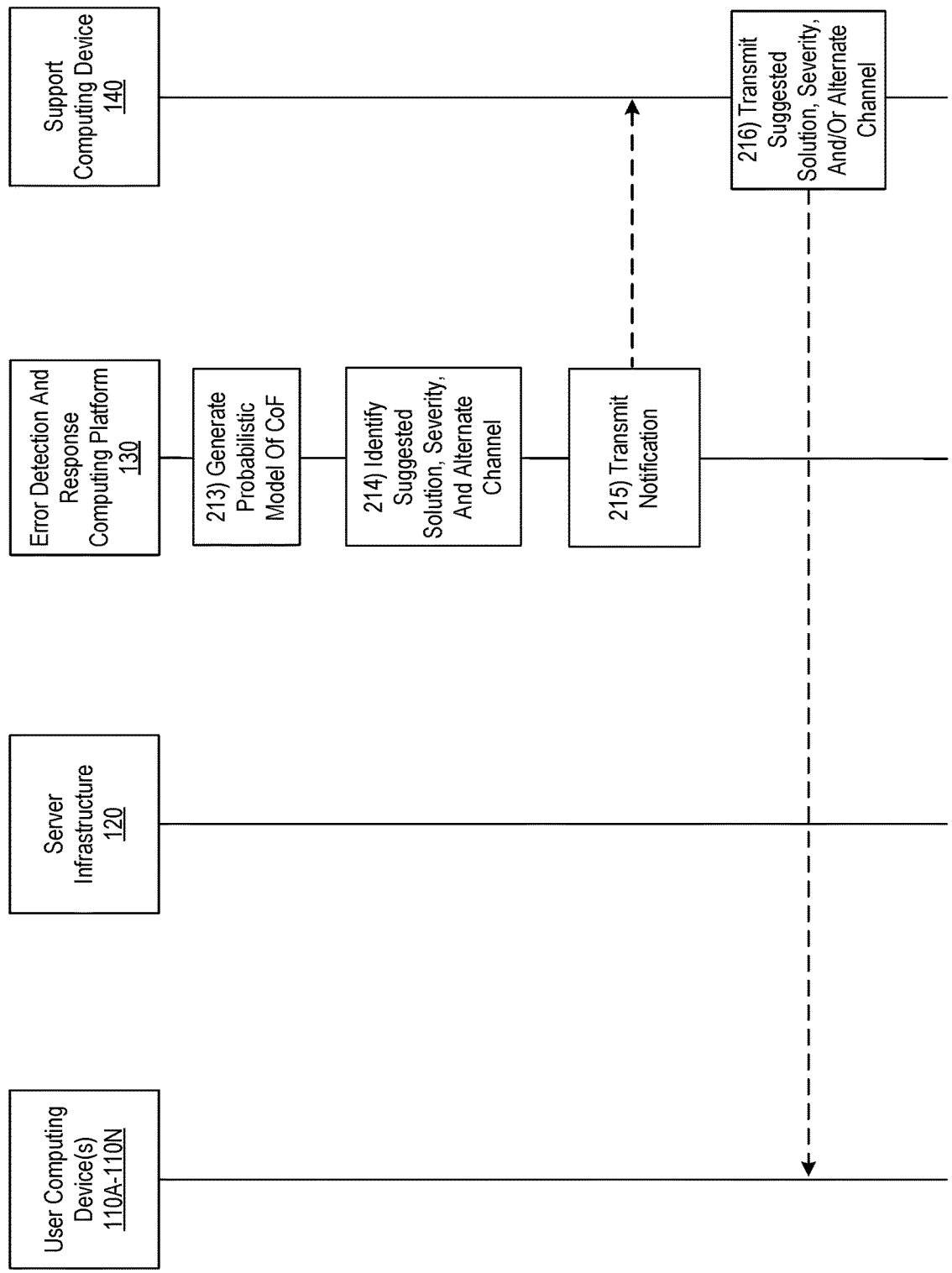

Referring to FIG. 2D, at step 213, machine learning application 133d may generate a mapping of the context of failure (e.g., association between the technical issue, customer intent, and customer sentiment) in relation to historic data comprised in historic data and analysis database 133e. In particular, machine learning application 133d may generate a probabilistic model of the context of failure that associates it with historic data, which may include root causes of the technical issue, feature availability in all channels, and negative actions including attrition data, reduced activity data, and transfer of services data. In order to do so, machine learning application 133d may use a machine learning algorithm including, but not limited, linear regression, logistic regression, decision tree, support vector machine (SVM), Naïve Bayes, k-nearest neighbors (KNM), k-means, random forest, dimensionality reduction, gradient boosting (GBM), AdaBoost, and the like. After generating the mapping, the machine learning application 133d may provide the mapping to data management module 133a.

At step 214, data management module 133a of error detection and response computing platform 130 may identify one or more of a suggested solution, severity assignment, and alternate channel based on the mapping of the context of failure in relation to the historic data. In doing so, data management module 133a may order the probabilistic model from a highest probability to a lowest probability for the context of failure in relation to one or more of the root causes of the technical issue, feature availability in all channels, and negative actions including attrition data, reduced activity data, and transfer of services data. For instance, the root causes of the technical issue may be associated with the suggested solution, the feature availability in all channels may be associated with the alternate channel, and the negative actions including the attrition data, reduced activity data, and transfer of services data may be associated with the severity assignment. Accordingly, the data management module 133a may select the suggested solution, severity assignment, and alternate channel for the system event based the highest probability for the context of failure in relation to each of the root causes of the technical issue, feature availability in all channels, and negative actions including attrition data, reduced activity data, and transfer of services data.

At step 215, data management module 133a of error detection and response computing platform 130 may transmit a notification including one or more of the identified suggested solution, severity assignment, and the alternate channel for the system event to support computing device 140 by way of communication interface(s) 132. At step 216, support computing device 140 may transmit one or more of the identified suggested solution, severity assignment, and the alternate channel for the system event to the respective user computing device from 110A-110N corresponding to the request from step 201. In some instances, the transmittal to the respective user computing device from 110A-110N may further include an input field through which a user of the user computing device may enter an efficacy rating corresponding to the effectiveness of the one or more of the identified suggested solution, severity assignment, and the alternate channel for the system event in resolving the failed system event.

Figure 2E:
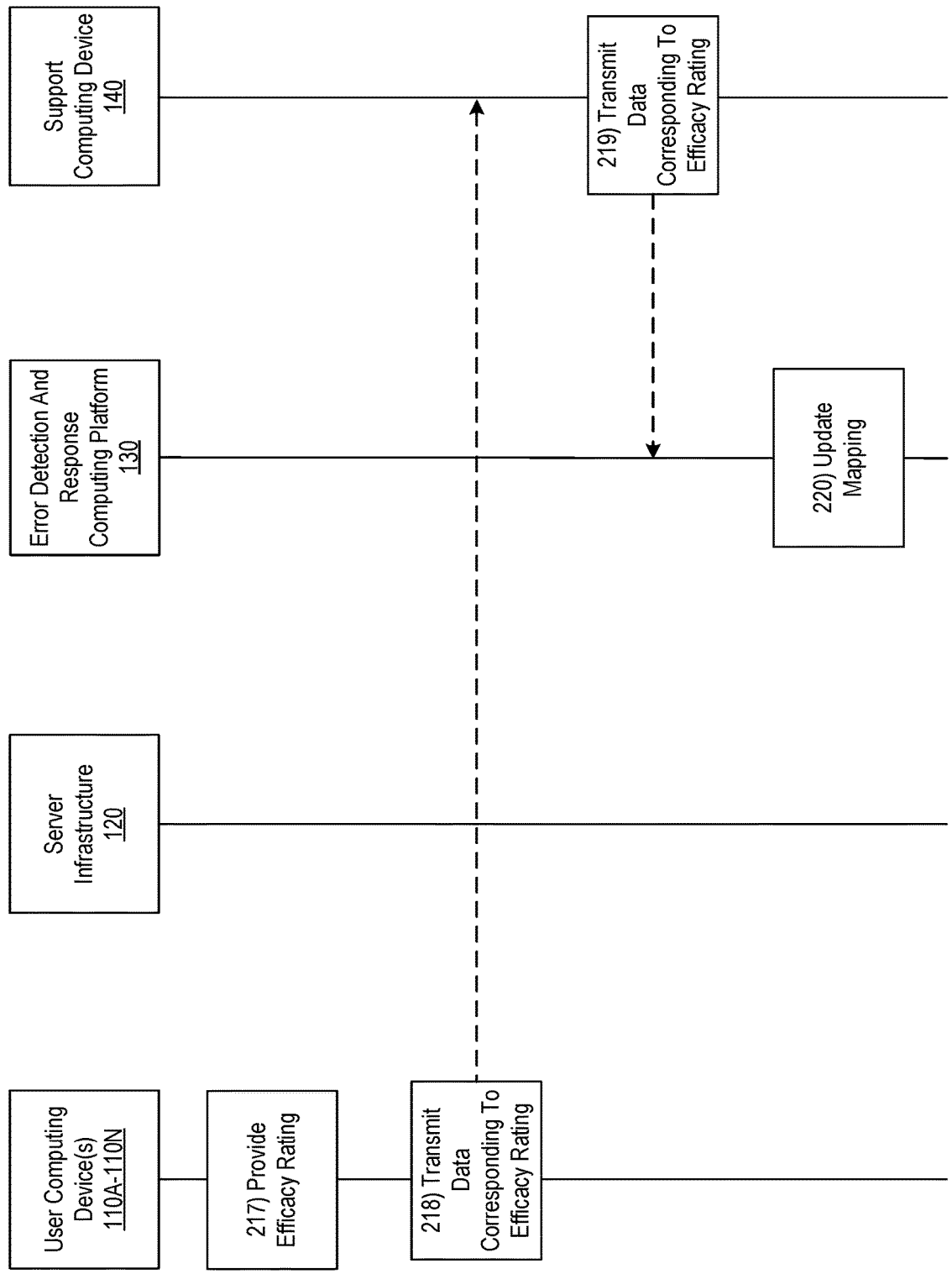

Referring to FIG. 2E, at step 217, the user of the respective user computing device from 110A-110N corresponding to the request from step 201 may provide an efficacy rating corresponding to each of the one or more of the identified suggested solution, severity assignment, and the alternate channel for the system event and, at step 218, the respective user computing device may transmit the efficacy rating to support computing device 140.

At step 219, the support computing device 140 may transmit the efficacy rating to error detection and response computing platform 130. At step 220, error detection and response computing platform 130 may utilize the efficacy rating to update the mapping between the context of failure of the system event and the historic data. In particular, error detection and response computing platform 130 may revise the probabilistic model of the context of failure in relation to the historic data according based the efficacy rating corresponding to each of the one or more of the identified suggested solution, severity assignment, and the alternate channel provided by the user. For example, in the event that one or more of the suggested solution, severity assignment, and alternate channel are indicated as being correct by the efficacy rating, the revisions to the probabilistic model may increase the likelihood of generating a probabilistic model associating a future context of failure of a similar type to the historic data corresponding to the suggested solution, severity assignment, and alternate channel. Conversely, in the event that one or more of the suggested solution, severity assignment, and alternate channel are indicated as being incorrect by the efficacy rating, the revisions to the probabilistic model may decrease the likelihood of generating a probabilistic model associating a future context of failure of a similar type to the historic data corresponding to the suggested solution, severity assignment, and alternate channel. As such, a future context of failure of a similar type may be mapped to different historic data and, thus, a different suggested solution, severity assignment, and alternate channel than those indicated as being incorrect by the efficacy rating.

Figure 3:
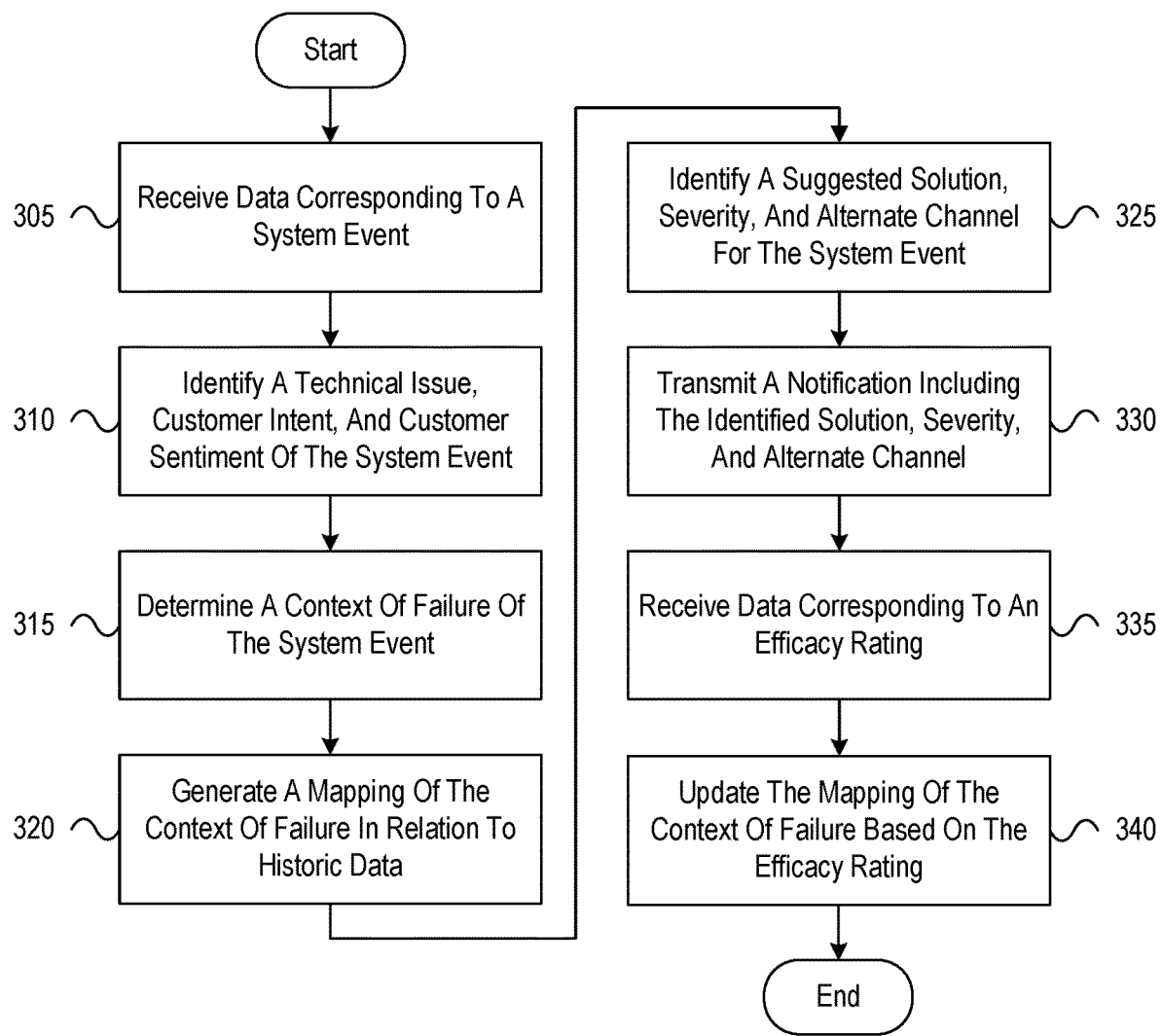
FIG. 3 depicts an illustrative method individualized channel error detection and resolution in accordance with one or more example embodiments.

FIG. 3 depicts an illustrative method for individualized channel error detection and resolution in accordance with one or more example embodiments. Referring to FIG. 3, at step 305, a computing platform having at least one processor, communication interface, and memory, may receive, via the communication interface, from server infrastructure, data corresponding to a system event associated with a channel of the server infrastructure. At step 310, the computing platform, based on the data corresponding to the system event, may identify a technical issue, customer intent, and customer sentiment of the system event. At step 315, responsive to identifying the technical issue, customer intent, and customer sentiment, the computing platform may determine a context of failure of the system event. At step 320, the computing platform may generate a mapping of the context of failure in relation to historic data. At step 325, the computing platform may identify a suggested solution, severity assignment, and alternate channel for the system event based on the mapping of the context of failure in relation to the historic data. At step 330, the computing platform may transmit, via the communication interface, to a support computing device, a notification including the identified suggested solution, severity assignment, and the alternate channel for the system event. At step 335, the computing platform may receive, via the communication interface, from the support computing device, data corresponding to an efficacy rating for each of the identified suggested solution, severity assignment, and the alternate channel. At step 340, the computing platform may update, based on the efficacy rating of each of the identified suggested solution, severity assignment, and the alternate channel, the mapping of the context of failure in relation to the historic data.

The various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computing platform, comprising:
at least one processor;
a communication interface communicatively coupled to the at least one processor; and
memory storing computer-readable instructions that, when executed by the at least one processor, cause the computing platform to:
receive, via the communication interface, from server infrastructure, data corresponding to a system event associated with a channel of the server infrastructure, the channel corresponding to first aspects of functionality of the server infrastructure;
based on the data corresponding to the system event, identify a technical issue, a customer intent corresponding to a purpose of the system event, wherein the customer intent is to give a gift for a particular purpose, and a customer sentiment corresponding to feelings of a customer based on failure of the system event;

responsive to identifying the technical issue, customer intent, and customer sentiment, determine a context of failure of the system event;

generate a mapping of the context of failure in relation to historic data;

identify a suggested solution, severity assignment, and alternate channel for the system event based on the mapping of the context of failure in relation to the historic data, wherein the severity assignment is further based, at least in part, on the particular purpose associated with the gift;

transmit, via the communication interface, to a support computing device, a notification including the identified suggested solution, severity assignment, and the alternate channel for the system event;

receive, via the communication interface, from the support computing device, data corresponding to an efficacy rating for each of the identified suggested solution, severity assignment, and the alternate channel; and update, based on the efficacy rating of each of the identified suggested solution, severity assignment, and the alternate channel, the mapping of the context of failure in relation to the historic data.

2. The computing platform of claim 1, wherein identifying the technical issue, customer intent, and customer sentiment comprises:

parsing the data corresponding to the system event into categories including page level feedback, complaint text, user memos, and system event information;

analyzing the page level feedback and the system event information to identify the technical issue of the system event;

responsive to identifying the technical issue of the system event, activating a natural language processing application; and analyzing, by the activated natural language processing application, the complaint text and user memos to identify the customer intent and the customer sentiment of the system event.

3. The computing platform of claim 1, wherein the historic data includes root causes of the technical issue, feature availability in all channels, and negative actions including attrition data, reduced activity data, and transfer of services data.

4. The computing platform of claim 3, wherein generating the mapping of the context of failure in relation to the historic data includes:

activating a machine learning application; and generating, by the activated machine learning application, a probabilistic model that associates the context of failure to the historic data, wherein the root causes of the technical issue are associated with the suggested solution, the feature availability in all channels is associated with the alternate channel, and the negative actions including the attrition data, reduced activity data, and transfer of services data is associated with the severity assignment.

5. The computing platform of claim 4, wherein identifying the suggested solution, severity assignment, and alternate channel for the system event based on the context of failure in relation to the historic data comprises:

ordering the probabilistic model from a highest probability to a lowest probability for the context of failure in relation to each of the root causes of the technical issue, feature availability in all channels, and negative actions including attrition data, reduced activity data, and transfer of services data; and selecting the suggested solution, severity assignment, and alternate channel for the system event based the highest probability for the context of failure in relation to each of the root causes of the technical issue, feature availability in all channels, and negative actions including attrition data, reduced activity data, and transfer of services data.

6. The computing platform of claim 4, wherein updating, based on the efficacy rating of each of the identified suggested solution, severity assignment, and the alternate channel, the mapping of the context of failure in relation to the historic data comprises:

revising the probabilistic model that associates the context of failure to the historic data to account for the efficacy rating of each of the identified suggested solution, severity assignment, and the alternate channel.

7. The computing platform of claim 1, wherein the alternate channel is updated for a new product launch or inclusion of a product in the channel of the server infrastructure.

8. A method, comprising:

at a computing platform comprising at least one processor, memory, and a communication interface:

receiving, by the at least one processor, via the communication interface, from server infrastructure, data corresponding to a system event associated with a channel of the server infrastructure, the channel corresponding to first aspects of functionality of the server infrastructure;

based on the data corresponding to the system event, identifying, by the at least one processor, a technical issue, a customer intent corresponding to a purpose of the system event, wherein the customer intent is to give a gift for a particular purpose, and a customer sentiment corresponding to feelings of a customer based on failure of the system event;

responsive to identifying the technical issue, customer intent, and customer sentiment, determining, by the at least one processor, a context of failure of the system event;

generating, by the at least one processor, a mapping of the context of failure in relation to historic data;

identifying, by the at least one processor, a suggested solution, severity assignment, and alternate channel for the system event based on the mapping of the context of failure in relation to the historic data, wherein the severity assignment is further based, at least in part, on the particular purpose associated with the gift;

transmitting, by the at least one processor, via the communication interface, to a support computing device, a notification including the identified suggested solution, severity assignment, and the alternate channel for the system event;

receiving, by the at least one processor, via the communication interface, from the support computing device, data corresponding to an efficacy rating for each of the identified suggested solution, severity assignment, and the alternate channel; and updating, by the at least one processor, based on the efficacy rating of each of the identified suggested solution, severity assignment, and the alternate channel, the mapping of the context of failure in relation to the historic data.

9. The method of claim 8, wherein identifying the technical issue, customer intent, and customer sentiment comprises:
parsing the data corresponding to the system event into categories including page level feedback, complaint text, user memos, and system event information;
analyzing the page level feedback and the system event information to identify the technical issue of the system event;
responsive to identifying the technical issue of the system event, activating a natural language processing application; and
analyzing, by the activated natural language processing application, the complaint text and user memos to identify the customer intent and the customer sentiment of the system event.

10. The method of claim 8, wherein the historic data includes root causes of the technical issue, feature availability in all channels, and negative actions including attrition data, reduced activity data, and transfer of services data.

11. The method of claim 10, wherein generating the mapping of the context of failure in relation to the historic data includes:
activating a machine learning application; and
generating, by the activated machine learning application, a probabilistic model that associates the context of failure to the historic data,
wherein the root causes of the technical issue are associated with the suggested solution, the feature availability in all channels is associated with the alternate channel, and the negative actions including the attrition data, reduced activity data, and transfer of services data is associated with the severity assignment.

12. The method of claim 11, wherein identifying the suggested solution, severity assignment, and alternate channel for the system event based on the context of failure in relation to the historic data comprises:
ordering the probabilistic model from a highest probability to a lowest probability for the context of failure in relation to each of the root causes of the technical issue, feature availability in all channels, and negative actions including attrition data, reduced activity data, and transfer of services data; and
selecting the suggested solution, severity assignment, and alternate channel for the system event based the highest probability for the context of failure in relation to each of the root causes of the technical issue, feature availability in all channels, and negative actions including attrition data, reduced activity data, and transfer of services data.

13. The method of claim 11, wherein updating, based on the efficacy rating of each of the identified suggested solution, severity assignment, and the alternate channel, the mapping of the context of failure in relation to the historic data comprises:
revising the probabilistic model that associates the context of failure to the historic data to account for the efficacy rating of each of the identified suggested solution, severity assignment, and the alternate channel.

14. The method of claim 8, wherein the alternate channel is updated for a new product launch or inclusion of a product in the channel of the server infrastructure.

15. One or more non-transitory computer-readable media storing instructions that, when executed by a computing platform comprising at least one processor, memory, and a communication interface, cause the computing platform to:
receive, via the communication interface, from server infrastructure, data corresponding to a system event associated with a channel of the server infrastructure, the channel corresponding to first aspects of functionality of the server infrastructure;
based on the data corresponding to the system event, identify a technical issue, a customer intent corresponding to a purpose of the system event, wherein the customer intent is to give a gift for a particular purpose, and a customer sentiment corresponding to feelings of a customer based on failure of the system event;
responsive to identifying the technical issue, customer intent, and customer sentiment, determine a context of failure of the system event;
generate a mapping of the context of failure in relation to historic data;
identify a suggested solution, severity assignment, and alternate channel for the system event based on the mapping of the context of failure in relation to the historic data, wherein the severity assignment is further based, at least in part, on the particular purpose associated with the gift;
transmit, via the communication interface, to a support computing device, a notification including the identified suggested solution, severity assignment, and the alternate channel for the system event;
receive, via the communication interface, from the support computing device, data corresponding to an efficacy rating for each of the identified suggested solution, severity assignment, and the alternate channel; and
update, based on the efficacy rating of each of the identified suggested solution, severity assignment, and the alternate channel, the mapping of the context of failure in relation to the historic data.

16. The one or more non-transitory computer-readable media of claim 15, storing further instructions that, when executed by the computing platform comprising the at least one processor, memory, and the communication interface, cause the computing platform to:
parse the data corresponding to the system event into categories including page level feedback, complaint text, user memos, and system event information;
analyze the page level feedback and the system event information to identify the technical issue of the system event;
responsive to identifying the technical issue of the system event, activate a natural language processing application; and
analyze, by the activated natural language processing application, the complaint text and user memos to identify the customer intent and the customer sentiment of the system event.

17. The one or more non-transitory computer-readable media of claim 15, wherein the historic data includes root causes of the technical issue, feature availability in all channels, and negative actions including attrition data, reduced activity data, and transfer of services data.

18. The one or more non-transitory computer-readable media of claim 17, storing further instructions that, when executed by the computing platform comprising the at least one processor, memory, and the communication interface, cause the computing platform to:
activate a machine learning application; and
generate, by the activated machine learning application, a probabilistic model that associates the context of failure to the historic data, wherein the root causes of the technical issue are associated with the suggested solution, the feature availability in all channels is associated with the alternate channel, and the negative actions including the attrition data, reduced activity data, and transfer of services data is associated with the severity assignment.

19. The one or more non-transitory computer-readable media of claim 18, storing further instructions that, when executed by the computing platform comprising the at least one processor, memory, and the communication interface, cause the computing platform to:
order the probabilistic model from a highest probability to a lowest probability for the context of failure in relation to each of the root causes of the technical issue, feature availability in all channels, and negative actions including attrition data, reduced activity data, and transfer of services data; and select the suggested solution, severity assignment, and alternate channel for the system event based the highest probability for the context of failure in relation to each of the root causes of the technical issue, feature availability in all channels, and negative actions including attrition data, reduced activity data, and transfer of services data.

20. The one or more non-transitory computer-readable media of claim 18, storing further instructions that, when executed by the computing platform comprising the at least one processor, memory, and the communication interface, cause the computing platform to:
revise the probabilistic model that associates the context of failure to the historic data to account for the efficacy rating of each of the identified suggested solution, severity assignment, and the alternate channel.

* * * * *

UNITED STATES PATENT AND TRADEMARK OFFICE
CERTIFICATE OF CORRECTION

PATENT NO. : 10,761,920 B2  
APPLICATION NO. : 15/407624  
DATED : September 1, 2020  
INVENTOR(S) : Beohar et al.

Page 1 of 1

It is certified that error appears in the above-identified patent and that said Letters Patent is hereby corrected as shown below:

On the Title Page

Column 1, (72) Inventors, Line 1:  
Delete "Hyperabad" and insert --Hyderabad--

Column 1, (72) Inventors, Line 2:  
Delete "Hyperabad" and insert --Hyderabad--

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*